(12) United States Patent
Cuddy

(10) Patent No.: US 6,216,607 B1
(45) Date of Patent: Apr. 17, 2001

(54) REUSABLE PALLET

(76) Inventor: William R. Cuddy, 4705 Gallagher Rd., Rochester, MI (US) 48306

(*) Notice: Subject to any disclaimer, the term of this patent is extended or adjusted under 35 U.S.C. 154(b) by 0 days.

(21) Appl. No.: 09/528,797

(22) Filed: Mar. 20, 2000

(51) Int. Cl.$^7$ .................................................. B65D 19/38
(52) U.S. Cl. ....................................... 108/55.5; 108/55.1
(58) Field of Search ............................... 108/55.1, 55.5, 108/57.33

(56) References Cited

U.S. PATENT DOCUMENTS

| | | | |
|---|---|---|---|
| 4,122,587 | * 10/1978 | Weiss et al. | |
| 5,355,813 | * 10/1994 | Darnell et al. | 108/55.3 |
| 5,833,289 | * 11/1998 | Brolin | 108/55.1 X |

FOREIGN PATENT DOCUMENTS

1361066 * 7/1974 (GB) .................................. 108/55.1

* cited by examiner

*Primary Examiner*—Janet M. Wilkens
(74) *Attorney, Agent, or Firm*—Gifford, Krass, Groh, Sprinkle, Anderson & Citkowski, P.C.

(57) ABSTRACT

A reusable pallet for goods having a generally rectangular base with first and second spaced apart sides and an upper surface for supporting the goods. A winch having a rotatable drum is mounted adjacent the first side of the base while a ratchet and pawl are provided with the winch for selectively locking the drum against rotation. A retaining pin is secured to the second or opposite side of the base and in alignment with the winch. An elongated and flexible strap has one end wound around the winch drum while a hook attached to the other end of the strap is selectively attachable to the retaining pin. An actuating rod is connected to the pin for selectively moving the pin between a first position in which the hook engages the retaining pin, and a second position in which the retaining pin is moved out of engagement with the hook thereby releasing the strap.

9 Claims, 4 Drawing Sheets

REUSABLE PALLET

BACKGROUND OF THE INVENTION

I. Field of the Invention

The present invention relates generally to a pallet for goods of the type used in manufacturing operations.

II. Description of the Prior Art

Many types of goods used in manufacturing operations, such as sheet metal, are typically transported on a rectangular pallet. The rectangular pallet includes an upper planar surface which supports the goods which are piled on top of the pallet.

In order to retain the goods to the pallet during shipping, typically crisscrossing steel bands extend across both the top of the goods as well as around the pallet. When use of the goods is desired at the manufacturing facility, the metal bands are typically cut from the pallet thus exposing the goods. In some cases, after the goods are used, the pallet is discarded.

There are several disadvantages to the previously known use of pallets for shipping goods to manufacturing facilities. One primary disadvantage is that the steel bands which retain the goods to the pallet, after removal from the pallet, are simply discarded. This is not only disadvantageously wasteful, but also creates a disposal problem for the steel bands. Furthermore, the steel bands are sharp, particularly at the point that they are cut from the pallet, and pose a potential safety hazard.

SUMMARY OF THE PRESENT INVENTION

The present invention provides a pallet for transporting goods to manufacturing facilities which overcomes all of the above-mentioned disadvantages of the previously known devices. In brief, the pallet of the present invention comprises a generally rectangular base having an upper planar surface on which the goods are supported. Typically, sheet goods, such as sheet metal, are supported on the pallet.

A winch having a rotatable drum is mounted to the pallet adjacent a first side of the pallet. This winch includes means, such as a pawl and ratchet, for selectively locking the winch drum against rotation.

A retaining pin is provided on the second or opposite side of the pallet. Furthermore, the retaining pin is aligned with the winch.

An elongated strap has one end wound around the winch drum while a hook is secured to the opposite or free end of the strap. This hook is dimensioned to engage and selectively attach to the retaining pin.

In operation, after the goods are placed on the upper surface of the pallet, the winch drum is unlocked, the strap is extended over the goods and the hook at the free end of the strap is attached to the retaining pin. Thereafter, the winch is rotatably driven to tighten the strap across the top of the goods and thus secure the goods to the pallet. When the strap is fully tightened, the winch drum is locked against rotation thus firmly securing the strap across the goods.

In the preferred embodiment of the invention, crisscrossing straps are provided along all four sides of the pallet and each strap includes its own associated winch. Furthermore, in the preferred embodiment of the invention, the retaining pins are selectively moved by an actuating rod between an engaged position and a released position. In their engaged position, the retaining pins are positioned to receive the hook at the end of its associated strap thus securing the strap to the retaining pin. Conversely, in its released position, the retaining pins are moved out of engagement with their associated hooks thus releasing the free ends of the strap and providing access to the goods on the pallet for unloading.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
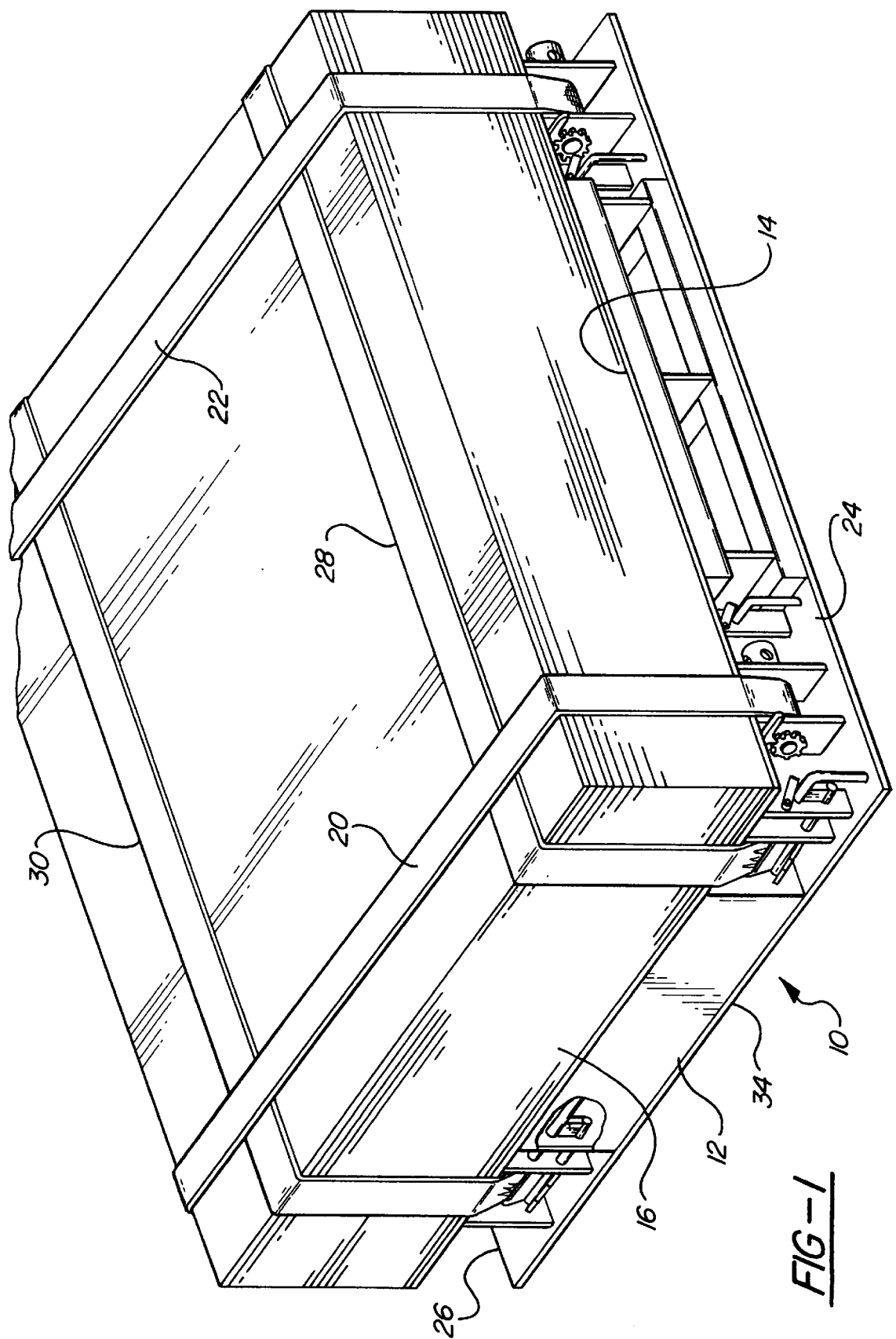
FIG. 1 is an elevational view illustrating a preferred embodiment of the present invention.
Figure 2:
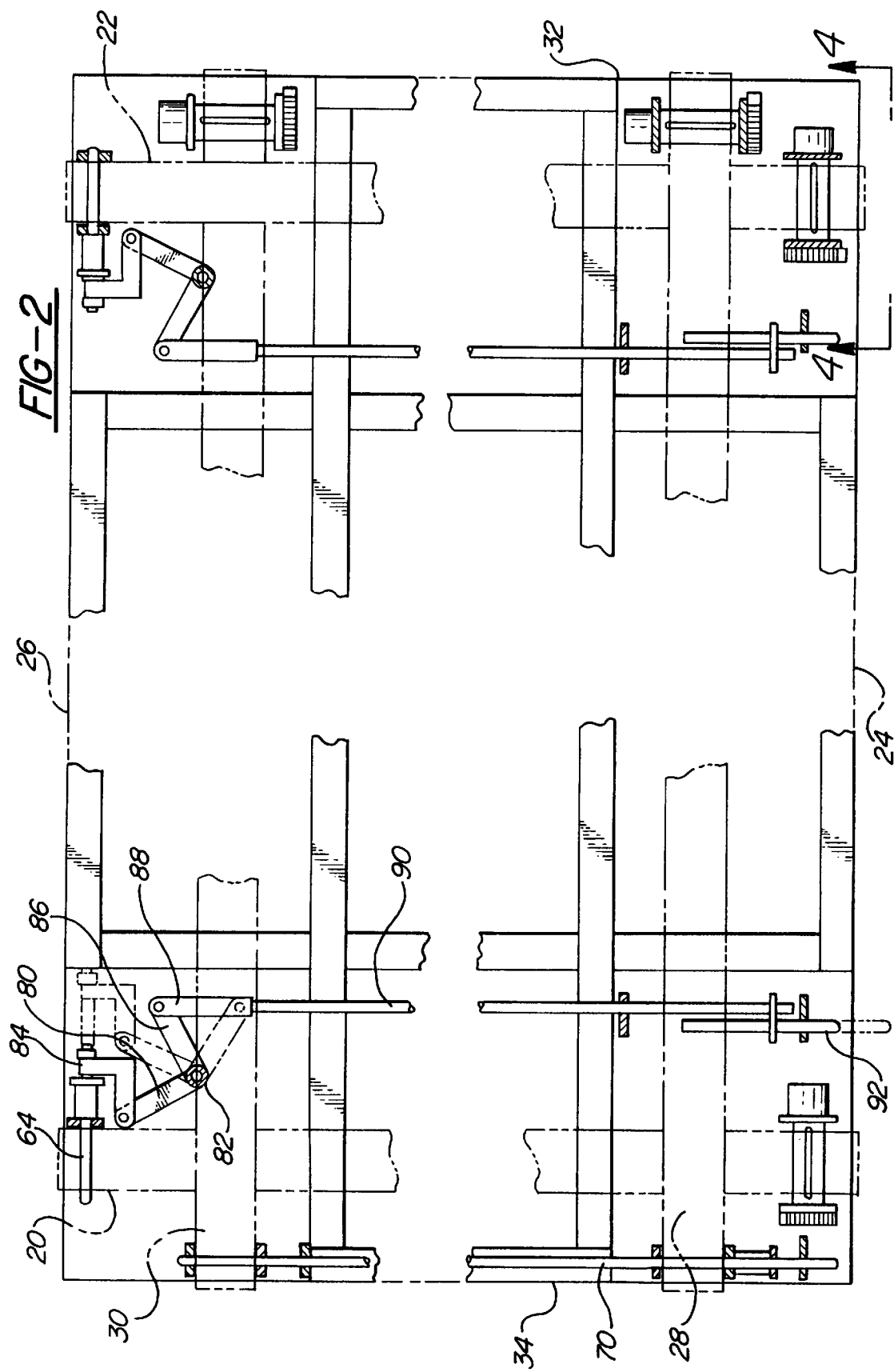
FIG. 2 is a bottom plan view illustrating the preferred embodiment of the present invention.

With reference first to FIGS. 1 and 2, a preferred embodiment of the reusable pallet 10 of the present invention is there shown and includes a generally rectangular base 12. The base 12 can be made of any suitable material, such as metal or plastic, and includes a top generally planar surface 14.

Goods 16 of the type used in manufacturing facilities are positioned upon and supported by the upper surface 14 of the base 12. The goods 16 are illustrated as a stack of sheet metal although the goods 16 may be any type.

Still referring to FIGS. 1 and 2, a pair of elongated straps 20 and 22 extend over the top of the goods 16 between two opposed sides 24 and 26 of the base 12. Similarly, two spaced apart cross straps 28 and 30 extend across the top of the goods 16 between the third and fourth sides 32 and 34, respectively, of the base 12.

Figure 4:
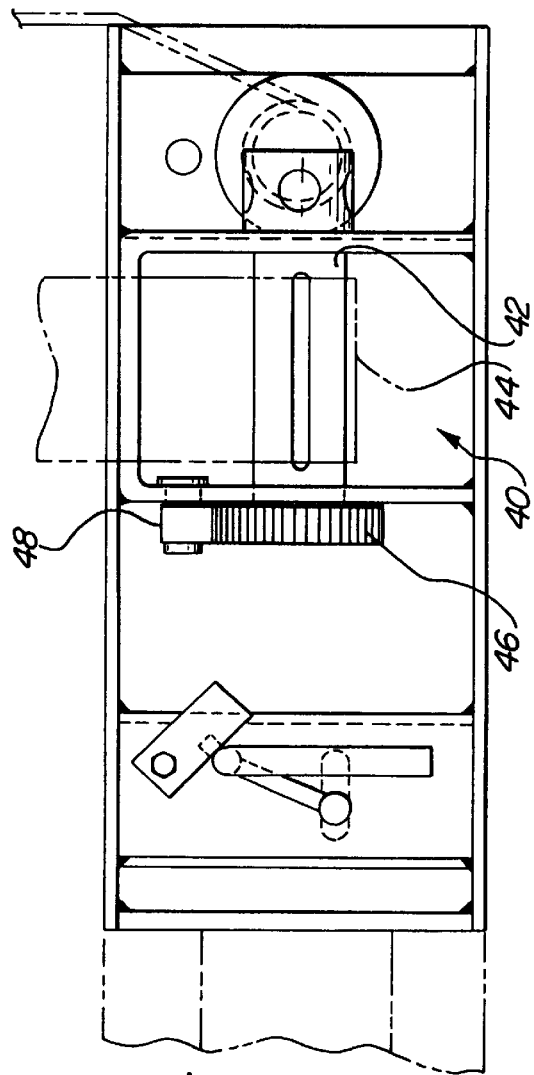
FIG. 4 is a fragmentary view taken substantially along line 4—4 in FIG. 2.
Figure 5:
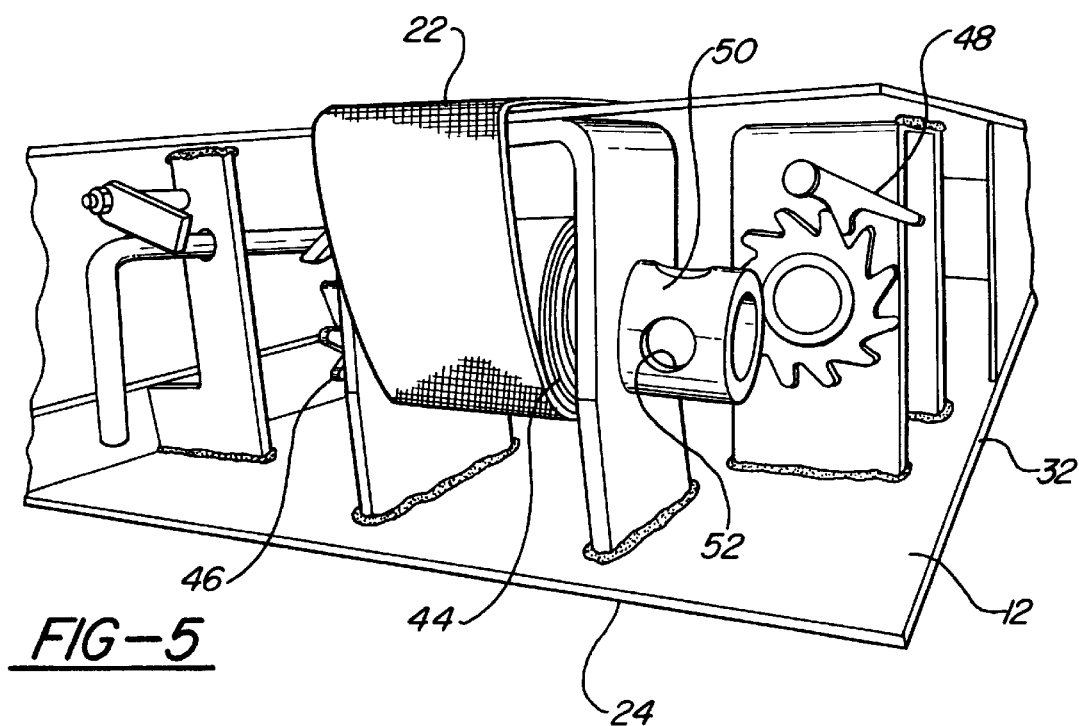
FIG. 5 is a fragmentary view illustrating a portion of the preferred embodiment of the invention.

With reference now to FIGS. 4 and 5, a winch 40 having a rotatable drum 42 is provided for each of the four straps 20, 22, 28 and 30. Only the winch 40 associated with the strap 22 will be described in detail, it being understood that a like description shall also apply to each winch 40 associated with the other straps.

Still referring to FIGS. 4 and 5, one end 44 of the strap 22 is wrapped around the rotatable winch drum 44 so that the effective length of the strap 22 is adjustable by rotation of the drum 44. Furthermore, a ratchet wheel 46 is secured to one end of the rotatable drum 42. A pawl 48 cooperates with the ratchet wheel 46 to selectively prevent rotation of the winch drum 42.

As best shown in FIG. 5, the other end 50 of the drum 42 includes a plurality of through openings so that a bar passing through the openings 52 can be utilized to rotate the winch drum 42 and thus tighten the belt 22. Alternatively, however, the end 50 of the winch drum 42 may be formed as a hex head which cooperates with a standard socket wrench.

Figure 6:
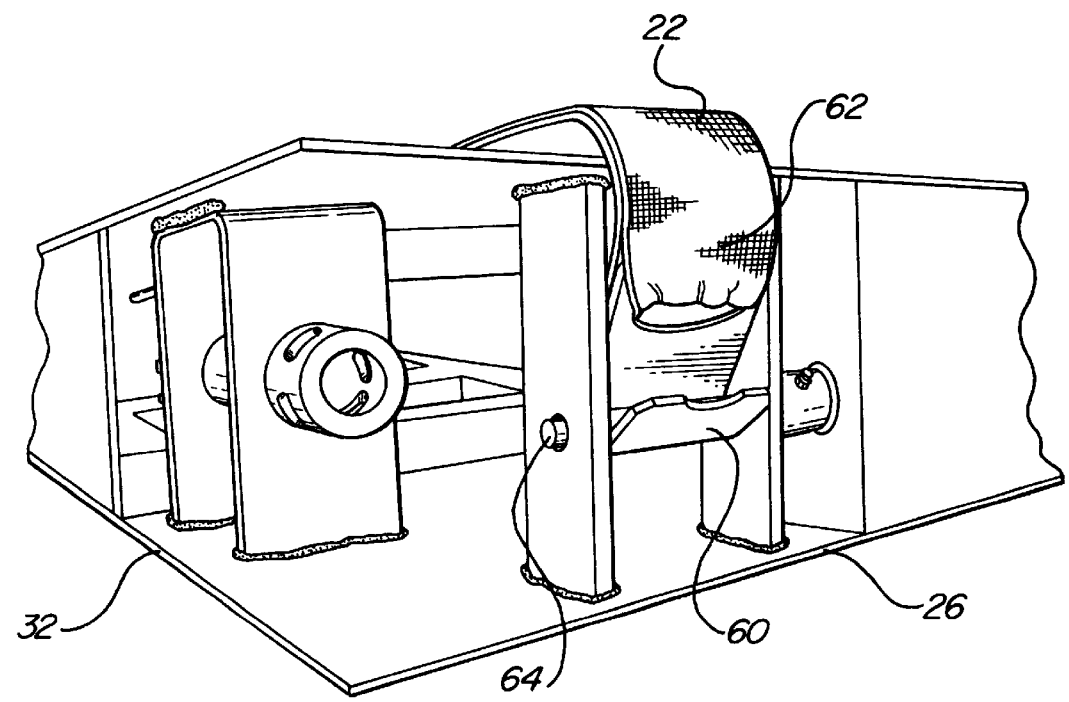
FIG. 6 is a fragmentary view illustrating a further portion of the preferred embodiment of the present invention.

With reference now to FIG. 6, a hook 60 is secured to the other or free end 62 of the strap 22. This hook 60 selectively engages and attaches to a retaining pin 64 secured adjacent the side 26 of the base 12.

Each strap 20, 22, 28 and 30 includes its own associated winch 40. Likewise, a hook 60 is secured to the free end of each of the four straps while a retaining pin 64 is aligned with and associated with the hook 60 at the free end 62 of each of the four straps.

Figure 3:
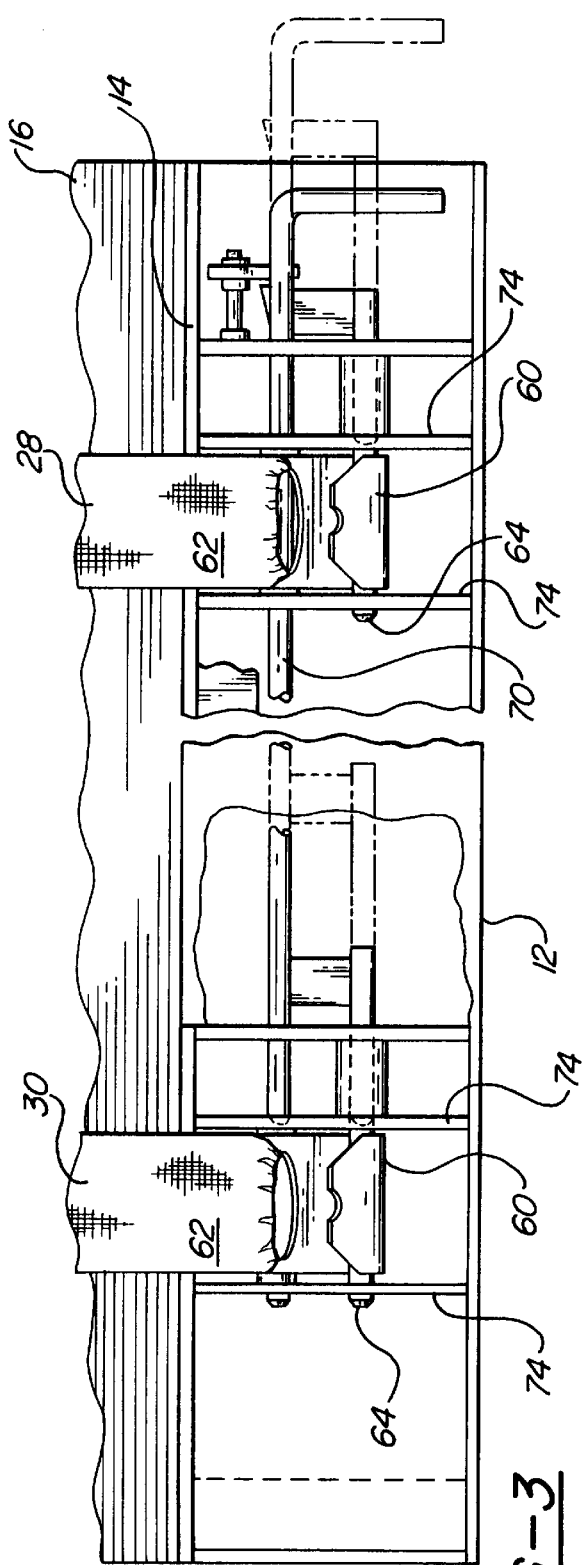
FIG. 3 is a fragmentary side view illustrating the preferred embodiment of the present invention.

With reference now particularly to FIG. 3, an elongated actuating rod 70 is secured to the two retaining pins 64 associated with the hooks on the straps 28 and 30. This elongated actuating rod 70 is horizontally slidably mounted in receiving bores formed in the base 12 so that the actuating rod 70 is movable between an engaged position, illustrated in solid line and a disengaged or released position, illustrated in phantom line. In its engaged position, the actuating rod 70 positions the retaining pins 64 through the hook 60 on the straps 28 and 30 thereby attaching the free ends of the straps 28 and 30 to the base 12. Furthermore, in their engaged position, the retaining pins 64 are positioned through receiving openings in braces 74 attached to the base 12.

Conversely, in their released position, the retaining pins 64 are moved out of engagement with the hook 60 on the straps 28 and 30. In doing so, the free ends 62 of the straps 30 and 28 disengage from the base 12.

With reference now to FIG. 2, the release mechanism for the retaining pins 64 associated with the straps 20 and 22 is there shown and includes a bell crank 80 which is pivotally mounted by a pivot pin 82 about a vertical axis to the base 12. One end 84 of the bell crank 80 is secured to the retaining pins 64 while the opposite end 86 of the bell crank 80 is secured to one end 88 of an elongated actuating rod 90. A handle 92 is secured to the other end of the actuating rod 90 adjacent the side 24 of the base 12.

The actuating rod 90 is horizontally slidably mounted to the base 12 and movable between an engaged position, illustrated in solid line in FIG. 2, and a disengaged or released position, illustrated in phantom line in FIG. 2. In the engaged position, the retaining pins 64 associated with the strap 20 or 22 is positioned through the hook at the free end of the strap 20 or 22 thus securing the free end of the strap 20 or 22 to the base 12. Conversely, when the actuating rod 90 is moved to its released position, the bell crank 80 pivots and axially moves its associated retaining pin 64 out of engagement with the hook at the free end of the strap 20 or 22 thus releasing the free end of the strap 20 or 22 from the base 12.

In operation and with the goods 16 supported on the upper surface 14 of the base 12, the straps 20, 22, 28 and 30 are positioned across the top of the goods as shown in FIG. 1. The hooks 60 at the free ends of the straps are positioned around their associated retaining pins 64 thus securing the free ends of the straps to the base 12.

The winch drums 42 are then rotatably driven thus tightening the straps 20, 22, 28 and 30 across the top of the goods 16. As the winch drums 42 are driven, the pawl 48 sequentially engages adjacent teeth in the ratchet wheel 46 thus locking the winch drum 42 against rotation. The winch drums are rotatably driven to the extent necessary to tighten the straps across the goods 16.

When it is desired to utilize the goods 16, the tension on the straps 20, 22, 28 and 30 is first released by applying a torque to the winch drum. The pawls 48 are then moved out of engagement with their associated ratchet wheels 46 thus loosening the straps 20, 22, 28 and 30. Thereafter, the actuating rods 70 and 90 are moved to their released position thus releasing the free ends of the straps 20, 22, 28 and 30 so that the straps can be removed from across the top of the goods 16. Preferably, the straps 20, 22, 28 and 30 are wound oil their respective winch drums 42 for storage.

After the goods 16 have been removed from the pallet 10, the pallet 10 can then be easily reused by placing different goods 16 on the upper surface of the base. The straps 20, 22, 28 and 30 are then positioned across the top of the goods so that the free ends of the straps are attached to their respective retaining pins 64. The winches 40 are finally tightened to securely hold the goods to the base 16.

An important feature of the present invention is that all three actuating rods 70, 90 and 90 are accessible from one side 24 of the base 12. Consequently, whenever the pallet is positioned closely adjacent a machine in preparation for the manufacturing operation, the straps 20, 22, 28 and 30 can still be readily and easily released provided, of course, that the side 24 of the base 12 is accessible.

From the foregoing, it can be seen that the present invention provides a simple and yet totally effective reusable pallet of the type used in manufacturing facilities. Having described my invention, however, many modifications thereto will become apparent to those skilled in the art to which it pertains without deviation from the spirit of the invention as defined by the scope of the appended claims.

What is claimed is:

1. A reusable pallet for goods comprising:
    a base having a first and second spaced sides and an upper surface for supporting the goods,
    a winch having a rotatable drum mounted adjacent said first side of said base,
    means for selectively locking said drum against rotation,
    a retaining pin secured to said second side of said base,
    at least one elongated and flexible strap, one end of said strap being wound around said drum, and
    means attached to the other end of said strap for attaching to said retaining pin.

2. The invention as defined in claim 1 wherein said means attached to said other end of said strap comprises a hook.

3. The invention as defined in claim 1 wherein said locking means comprises a ratchet wheel and pawl.

4. The invention as defined in claim 1 and comprising means for selectively moving said retaining pin between a first position in which said attaching means at said other end of said strap is attached to said retaining pin, and a second position in which said attaching means at said other end of said strap is disengaged from said retaining pin.

5. The invention as defined in claim 1 in which said at least one strap comprises two straps extending between said first and said second sides, each strap having its own winch, retaining pin and attaching means.

6. The invention as defined in claim 5 and comprising means for selectively simultaneously moving said retaining pins between a first position in which said attaching means at said other end of each said strap is attached to its associated retaining pin, and a second position in which said attaching means at said other end of each said strap is disengaged from its associated retaining pin.

7. The invention as defined in claim 1 wherein said base is generally rectangular in shape having a third and fourth opposing sides and comprising:

a further winch having a rotatable drum mounted adjacent said third side of said base, means for selectively locking said drum of said further winch against rotation, a further retaining pin secured to said fourth side of said base, at least one elongated and flexible cross strap, one end of said cross strap being wound around said drum of said further winch, and means attached to the other end of said cross strap for attaching to said further retaining pin.

8. The invention as defined in claim 7 and comprising means adjacent said third side of said base for selectively moving said further retaining pin between a first position in which said attaching means at said other end of said cross strap is attached to said further retaining pin, and a second position in which said attaching means at said other end of said cross strap is disengaged from said further retaining pin.

9. The invention as defined in claim 8 wherein said means for selectively moving said further retaining pin comprises a bell crank having one end secured to said further retaining pin, and an elongated actuating rod having one end secured to the other end of the bell crank and the other end of the actuating rod positioned adjacent said third side of said base.

* * * * *